United States Patent
Kuhn et al.

[11] Patent Number: 5,798,983
[45] Date of Patent: Aug. 25, 1998

[54] ACOUSTIC SENSOR SYSTEM FOR VEHICLE DETECTION AND MULTI-LANE HIGHWAY MONITORING

[76] Inventors: John Patrick Kuhn, 14710 Kogan Dr., Woodbridge, Va. 22193; Binh C Bui, 9113 Lake Braddock Dr., Burke, Va. 22015; Gregory J Pieper, 295 Waycross Way, Arnold, Md. 21012

[21] Appl. No.: 861,901

[22] Filed: May 22, 1997

[51] Int. Cl.$^6$ .................................... H04B 11/00
[52] U.S. Cl. .............................. 367/135; 367/127
[58] Field of Search ................... 367/135, 13, 118, 367/129, 124, 127; 340/943, 936, 933, 903, 904

[56] References Cited

U.S. PATENT DOCUMENTS

| | | | |
|---|---|---|---|
| 3,681,750 | 8/1972 | Larka | 367/135 |
| 3,732,536 | 5/1973 | Larka et al. | 367/135 |
| 4,626,850 | 12/1986 | Chey | 340/903 |

*Primary Examiner*—Daniel T. Pihulic

[57] ABSTRACT

A novel multi-lane traffic monitoring system is based on detecting the acoustic signals motor vehicles create and radiate during operation. The system comprises an array of electro-acoustic sensors for converting impinging acoustic wavefronts to analog electrical signals; a circuit to acquire, perform signal frequency component discrimination, and digitize the electrical signals at the electro-acoustic sensor array output; a circuit to perform effective spatial discrimination in the up/down road direction and in the cross-road direction in real time; a circuit to perform vehicle detection for individual lanes and to estimate or measure pertinent parameters associated with each vehicle detection from each traveled lane; and a circuit to compute for each lane, pertinent traffic flow parameters from vehicle parameters for the purpose of providing a transportation system interface. In accordance with another embodiment, a circuit is provided to automatically scan for acoustic sources in the cross-road direction and to automatically identify each highway lane direction relative to the physical electro-acoustic sensor array orientation. In accordance with still another embodiment, a circuit is provided via signal frequency component discrimination and signal processing to create, from a single physical sensor, two vehicle detection zones within each highway lane, wherein a smaller detection zone is located inside a larger detection zone. A circuit is also provided to measure the time between initial vehicle detection in the larger (outer) detection zone and initial vehicle detection in the smaller (inner) detection zone, wherein vehicle speed is determined from the initial detection time difference. In accordance with yet another embodiment, a circuit is provided to measure the relative position of the sound radiated from each of a vehicle's tires and determine vehicle type classification associated with each vehicle detection and with each measured vehicle speed.

14 Claims, 13 Drawing Sheets

ACOUSTIC SENSOR SYSTEM FOR VEHICLE DETECTION AND MULTI-LANE HIGHWAY MONITORING

BACKGROUND OF THE INVENTION

1) Field of The Invention

The invention relates to highway traffic monitoring systems and more particularly to systems which detect the presence of motor vehicles on a multilane highway at a specific location and determine pertinent information about the vehicular traffic. Such information includes vehicle count per lane per unit time, vehicle type or class and speed, average speed and traffic density or lane occupancy.

2) Description of The Prior Art

Highway traffic monitoring has been an ongoing activity for many years for the purposes of road use data collection for required reporting and planning and for real-time traffic management. With growing highway congestion, the need for effective traffic management and traveler information systems has increased dramatically. Effective traffic management and traveler information systems require substantial highway traffic surveillance capability. Highway traffic surveillance capability includes detecting the presence or passage of motor vehicles on a lane by lane basis, and measuring or estimating important parameters such as vehicle count, speed, and type.

Many sensor technologies exist and have been utilized to monitor highway traffic. In-pavement metal detectors such as magnetic induction loops or magnetometers have long been the sensor of choice for vehicle detection. For example, a magnetic induction loop is a loop or several loops of wire which is embedded or cut into the pavement in the middle of a traveled lane. The ends of the wire are connected to a detector (oscillator circuit). When a vehicle moves over the loop, the inductance in the oscillator circuit changes which causes the frequency of the oscillator to change. This change is detected indicating the presence of a vehicle. The magnetic induction loop detector circuit activates a "vehicle presence relay" from which, traffic flow parameters such as vehicle count per lane per unit time and lane occupancy can be computed. A single magnetic inductance loop detector or magnetometer cannot directly measure vehicle speed. To measure vehicle speed (not average flow speed), two loops which are physically separated (typically by several feet) must be used. The difference between the initial detection time on the first loop and the initial detection time on the second loop divided by the distance between the loops gives speed. As more and more vehicle designs include plastics, composite material, and nonferrous material, the detection performance of loops and other sensors which use magnetic field perturbation as the means of detection will decrease. Loops and other in-pavement sensors also have an inherently high mechanical failure rate due to significant mechanical stresses caused by the pavement (it moves due to the vehicular load, and due to weather changes). Authorities which use in-pavement sensors must also close highway lanes for several hours to install or replace the sensors. In many areas, closing lanes is considered a last resort due to the traffic problems it causes.

Many different non-invasive (no contact with pavement) sensor technologies are in use for traffic monitoring. These technologies include radar based sensors, ultrasound sensors, video imaging, infra-red sensors, and passive (receive only) acoustic. Sensors are either active or passive in their operation.

Active sensors (like radar, ultrasound, or active infra-red) detect vehicles by emitting a signal and detecting the reflection of the signal from a vehicle or by detecting the lack of signal at a receiver (break beam). While non-invasive to the pavement, these active sensors are still intrusive to the motorist in that they radiate energy which impinges on the motorists and can cause interference in equipment or even raise health issues. Performance of these active sensors (particularly active ultrasound) is also sensitive to weather (temperature, humidity, rain, snow, fog, etc.) mainly because they employ some form of range gating (transmit a pulse and wait a period of time corresponding to reflecting from a specific range before enabling detection) and because they rely on reflection (snow cover or snow flakes impact reflecting properties of materials and temperature and moisture impact the signal propagation path). Active sensors have the ability to measure vehicle speed by measuring the Doppler frequency shift of the reflected signal compared to the transmitted signal frequency. However, the direction of signal transmission and reflection must be along the direction of travel of the vehicle whose speed is being measured. As the transmitted and reflected signal direction approaches perpendicular to the vehicle direction of travel, the ability to measure Doppler shift approaches zero since the vehicle speed component along the vector connecting the sensor and the vehicle approaches zero. Active sensors which use Doppler to measure speed must be positioned over the lane to be monitored and must be pointed in the up or down road direction. While this orientation is optimum for vehicle speed measurement via Doppler, it is the worst orientation for separating vehicles (counting vehicles) and for measuring lane occupancy. Since authorities desire to avoid closing lanes and minimizing maintenance costs, sensor mounting at roadside positions (not over active lanes) with the sensor pointed across the lanes is preferred. This is the worst position for active sensors for measuring speed.

Passive sensors such as video rely on receiving reflected signals (light) from the object to be detected and on sophisticated processing means to distinguish between background with no vehicle present and background with a vehicle present. Passive infra-red on the other hand relies on a combination of vehicle emitted signal (engine heat, tire friction heat, etc.) and some reflected signal. Video sensor performance suffers severely in low light, low contrast conditions and during low visibility conditions such as snow white-outs or thick fog. Infrared sensors are somewhat less susceptible to low visibility conditions, however, unpredictable vehicle signatures and an ambient background (i.e. highway surface temperature and surrounding air temperature) for infrared signals which can vary dramatically in short periods of time make vehicle detection without a high false alarm rate difficult.

Passive sensors such as acoustic rely on detecting sound signals generated by each vehicle and on processing means to distinguish between background with no vehicle present and background with a vehicle present. Investigation and analysis of the acoustic energy radiated by vehicles using the highway shows that there is a significant frequency band of reliable acoustic signals from every vehicle which could be used for detection. This frequency band extends from near f =0 Hz to f>16000 Hz with significant energy at the lower frequencies below f=3000 Hz. Analysis has also showed that at frequencies lower than f=8000 Hz, the sound level from large trucks (tractor trailers, commercial trucks, etc.) traveling at high speed (tire noise) was typically more than 35 dBv to 40 dBv greater than the sound level from many passenger cars traveling at the same speeds. Hence, acoustic detection of vehicles on a per lane basis with a acceptable number of false detections from out of lane sound sources requires very effective spatial discrimination means.

Previous vehicle detection embodiments such as U.S. Pat. No. 5,060,206 entitled "Marine Acoustic Aerobuoy and Method of Operation", October 1991 by F. C. de Metz Sr. and U.S. Pat. No. 3,445,637 entitled "Apparatus for Measuring Traffic Density", May 1969 by J. M. Auer Jr. provide for acoustic detection using a single or a plurality of omni-directional microphones. These approaches, however, rely on the proximity of the sound source (vehicle to be detected) for detection. That is, each microphone signal is input to a detection means to determine the presence or absence of a sound source. If other sound sources are within detection range of the sensor (with detection means) they too will be detected. These suggested embodiments provide absolutely no spatial discrimination means other than detection range or proximity. If a sound source is close to the receiving microphone it is detected, if it is not close enough to the receiving microphone, spreading loss attenuates the signal (according to 20 log R where R is the distance from the sound source to the receiving microphone) and it is not detected. Consider the situation in which a passenger vehicle is present in the middle lane of a three lane highway and a tractor trailer vehicle is present in the adjacent lane, and a large commercial truck is present in the other adjacent lane. Assume that a microphone (and detection means) (as provided for in the above referenced embodiments) is placed in the center of the center lane. The sound sources from the two adjacent lanes (they are the interferers or the sound sources to be discriminated against) are no more that 8 to 12 feet (using current highway standards) from the receiving microphone (and detection means). Using the well known and well understood (to those skilled in the art) spreading loss formula (20 log R), it is shown that the sound level received from these interfering sound sources would be attenuated (range discrimination due to spreading loss) no more than 9 dBv to 12 dBv. Since the sound level from these adjacent lane sound sources (as stated above) could be as much as 40 dBv higher than the sound level from the middle lane passenger vehicle (desired detection in this example), they are (even after spreading loss due to being further away) more detectable that the signal from the desired (in-lane) vehicle. Therefore, acoustic detection embodiments which employ single or multiple omni-directional sensors and utilize proximity (or distance from the sensor) as the only spatial discrimination means do not address the issues and problems of highway traffic monitoring. Other embodiments such as U.S. Pat. No. 3,047,838 entitled "Traffic Cycle Length Selector", July 1962 by G. D. Hendricks provide a form of spatial discrimination (in-bound vs. out-bound traffic volume) by using a plurality of sensors in a field (disposed in each lane of a multilane highway) and by collecting the outputs of the field of proximity sensors. While Hendricks provides that any one of a variety of sensor types could be utilized as the individual vehicle detectors in the sensor field, his chooses pressure type sensors for illustration. Based on the above discussion and example, the Hendricks embodiment using microphones instead of pressure sensors would fail in the presence of high level acoustic sound sources and when traffic density is high (the most important time). As demonstrated in the above example, high level sound sources (such as tractor trailers) would be detected on all sensors in the field to such an extent as to cause false contribution from all lanes (instead of just one) and to mask the presence of any weaker sources (many passenger cars). This would lead to a significant distortion of the overall traffic flow information collected and a complete corruption of the specific information for each traffic direction.

To achieve effective multilane highway vehicle detection by exploiting the acoustic signals radiating from each vehicle, a means of spatial discrimination is needed which goes well beyond simply associating the non-coherent signal level or presence outputs from each omni-directional acoustic sensor (microphone) in the field. For air acoustics and particularly for underwater acoustics, large body of prior art exists which deals with acoustic detection and spatial discrimination under the topic of acoustic beamforming also known as time delay beamforming or phase shift beamforming. Some references include the text books *Principles of Underwater Sound* (3rd Ed.) by R. J. Urick (1983), *Underwater Acoustic System Analysis* by W. S. Burdic (1984), and *Underwater Acoustics* by L. J. Ziomek (1985).

Consider a plurality of omni-directional acoustic sensors (microphones) arranged as a closely spaced array in a mounting structure which is located at a distance from each traffic lane to be monitored. The distance from the array of microphones to each traffic lane to be monitored is such that acoustic signals leaving their source (vehicle to be detected) arrive at the array of microphones with an acoustic wavefront which is, for most purposes a plane wavefront (really a spherical or cylindrical wavefront with very large radius compared to the dimensions of the array of microphones). Each acoustic signal from each vehicle will arrive at the distant microphone array with different wavefront angles (or spatial angles). This configuration can realize effective multilane traffic monitoring based on acoustic signal detection, if, in addition to converting the acoustic signals into electrical signals at the microphone outputs there is: 1) a means of reducing the ambient noise with which each plane wave signal (signal from each vehicle) must compete (signal gain), 2) provide for the separate detection or resolution of plane wave signals arriving from different directions (separate detection per lane), and provide for the determination of the direction of arrival of each plane wave signal (for each detection determine which lane the signal originated in).

A previous embodiment for acoustical based highway vehicle detection uses a plurality of acoustic sensors (microphones) and conventional processing to create a single detection zone (one lane). Since this embodiment produces only a single detection zone, vehicle speed cannot be directly measured unless two sensors are used and placed or pointed such that each resulting detection zone physically separated from the other (in the up/down road direction). The approach uses a signal product means between two perpendicular line arrays of sensors (microphones) known as a Mill's Cross (*Microwave Scanning Antenna*, R. C. Hansen, (1964) and *Principles of Underwater Sound*, R. J. Urick (1983)) and because of this, only the non-coherent acoustic signal envelope (signal power) is provided as output for vehicle detection. This technique is also known as a combination of a summing beamformer (to get the line array signal outputs) and a multiplicative beamformer or correlator (to get the power output). This embodiment does not produce a coherent output signal which can be utilized for vehicle type processing means (spectrum analysis) and for vehicle speed processing means (Doppler shift analysis). This embodiment does not provide for variable (or scanning) time delays or variable phases between all sensor elements and therefore does not provide a means for multiple detection zones or advanced interference rejection. Hence, this embodiment does not provide for out of detection zone or out of lane interference rejection other than via the sidelobe attenuation from conventional weighting and summing means for each set of line array sensors (line array conventional beamforming). Theoretical sidelobe (out of zone rejection) attenuation of 32–40 dBv is possible, however, given the nature of components (even close tolerance), microphone matching and cost constraints, and assembly tolerances, only about 25 dBv of attenuation is consistently achievable. Based on the above example discussing the signal level difference between passenger cars and large trucks (35 dBv to 40 dBv), the amount of out of lane rejection achievable with this embodiment will not be adequate to prevent false detections from out of lane vehicles with high acoustic source signal levels. This embodiment provides a detection zone orientation relative to the sensor enclosure which is established at install time. This embodiment does not provide a means for manual or automatic sensor zone placement or calibration after it is installed, hence, the sensor must be "pointed" accurately when installed or detection performance will be adversely impacted. If the traveled lane positions change, the sensor for this embodiment must be mechanically re-pointed (loosen the bracket and re-point). This embodiment does not provide for multiple detection zones (multi-lane monitoring), hence, there must be a one sensor for each lane to be monitored resulting in increased procurement cost, maintenance cost, and installation cost and increased structural mounting complexity. There is also increased power consumption making the use of autonomous operation (solar power) more costly.

SUMMARY OF THE INVENTION

In view of the increasing highway monitoring requirements and the many problems with existing vehicle detection and traffic monitoring technology, a primary object of the present invention is to provide an acoustic sensor system for multi-lane traffic monitoring which can be mounted on existing fixtures above highway lanes or highway shoulders and which can accurately and economically detect the presence and passage of motor vehicles or the like in individual lanes or the like for a simple or complex multi-lane highway or the like.

It is another object of the present invention to provide a multi-lane traffic monitoring system which eliminates highway pavement intrusion and costly lane closures during installation and maintenance.

It is still another object of the present invention to provide a multi-lane traffic monitoring system which eliminates radiated signal intrusion to motorists and the environment by utilizing passive acoustic signal detection, processing, and interference rejection techniques.

It is a further object of the present invention to provide a multi-lane traffic monitoring system which minimizes performance sensitivity to weather variation or visibility conditions.

It is yet another object of the present invention to provide a multi-lane traffic monitoring system which minimizes false vehicle detections due to out of lane vehicle noise or off-road noise.

It is an object of the present invention to provide a multi-lane traffic monitoring system which minimizes installation complexity and time by automatically identifying the positions of active traveled lanes and automatically calibrating to the lane positions.

It is another object of the present invention to provide a multi-lane traffic monitoring system which can accurately measure vehicle speed using a single physical sensor aperture.

It is yet another object of the present invention to provide a multi-lane traffic monitoring system which can accurately determine vehicle type using a single physical sensor aperture.

It is still another object of the present invention to provide a multi-lane traffic monitoring system which minimizes electrical power usage and facilitates autonomous operation using solar panel charged batteries for electrical power.

These and other objects of the present invention are achieved in a novel multi-lane traffic monitoring system which is based on detecting the acoustic signals each and every motor vehicle create and radiate during operation. Significant acoustic signal sources include but are not limited to tire noise, engine and exhaust noise, and related engine compartment equipment noise.

The system comprises an array of electro-acoustic sensors for converting impinging acoustic wavefronts to analog electrical signals; means to acquire, perform signal frequency component discrimination, and digitize the electrical signals at the electro-acoustic sensor array output; means to perform effective spatial discrimination in the up/down road direction and in the crossroad direction in real time; means to perform vehicle detection for individual lanes and to estimate or measure pertinent parameters associated with each vehicle detection from each traveled lane; and means to compute for each lane pertinent traffic flow parameters from vehicle parameters for the purpose of providing a transportation system interface.

In accordance with another facet of the present invention, means are provided to automatically scan for acoustic sources in the cross-road direction and to identify each highway lane direction relative to the physical electro-acoustic sensor array orientation.

In accordance with still another facet of the present invention, means are provided via signal frequency component discrimination and signal processing to create two vehicle detection zones within each highway lane, wherein a smaller detection zone is located inside a larger detection zone. Means are also provided to measure the time between initial vehicle detection in the larger (outer) detection zone and initial vehicle detection in the smaller (inner) detection zone, wherein vehicle speed is determined from the initial detection time difference.

In accordance with yet another facet of the present invention, means are provided to measure the relative position of the sound radiated from each of a vehicle's tires and determine vehicle type classification associated with each vehicle detection and with each measured vehicle speed.

BRIEF DESCRIPTION OF THE DRAWINGS

The novel and distinctive features of the invention are set forth in the claims appended to the present application. The invention itself, however, together with further objects and advantages thereof may be best understood by reference to the following description and accompanying drawings, in which:

DESCRIPTION OF THE PREFERRED EMBODIMENT

Figure 1:
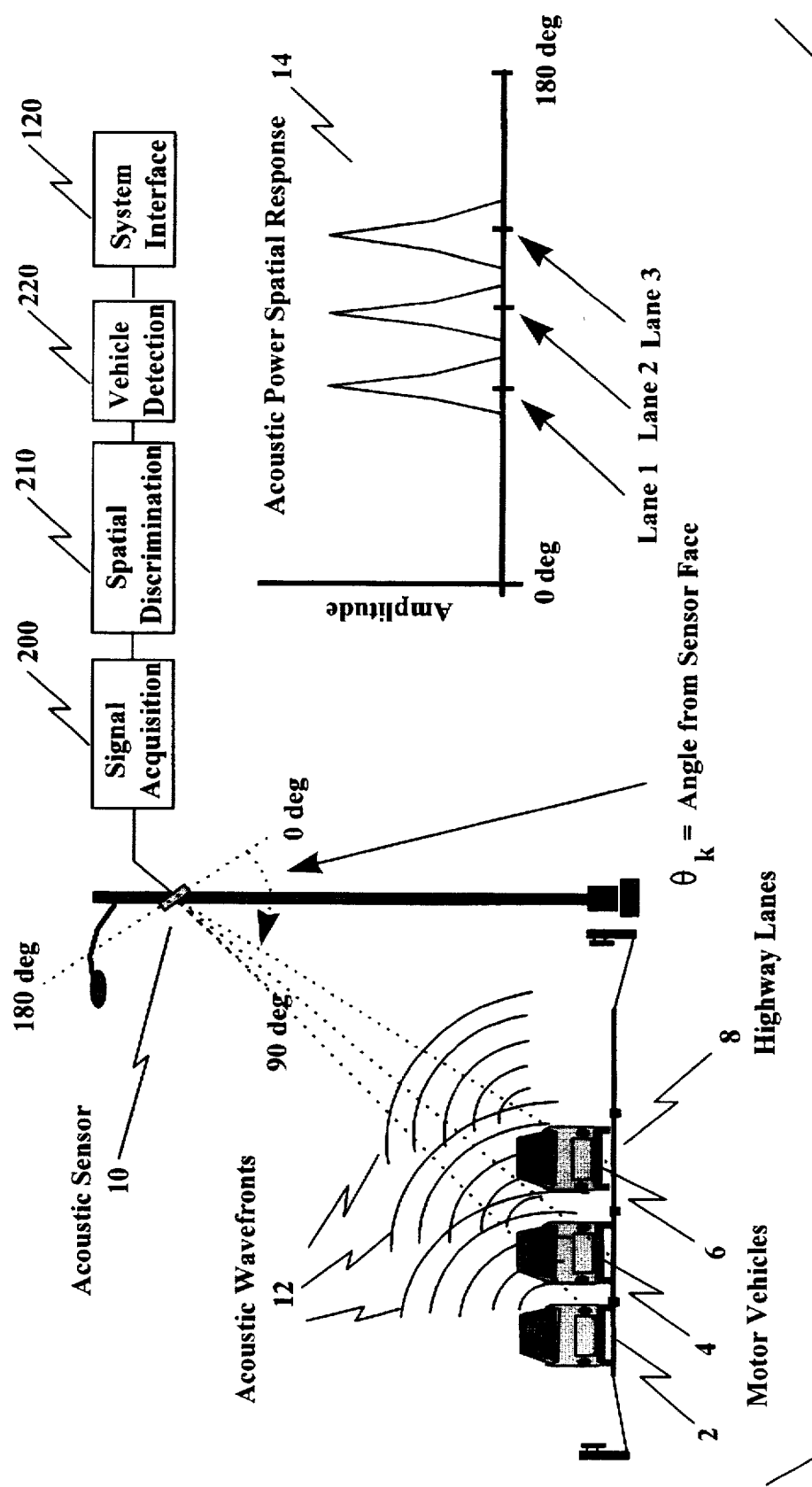
FIG. 1 is a circuit diagram showing the essential components of an acoustic sensor system for multi-lane highway monitoring.
Figure 2:
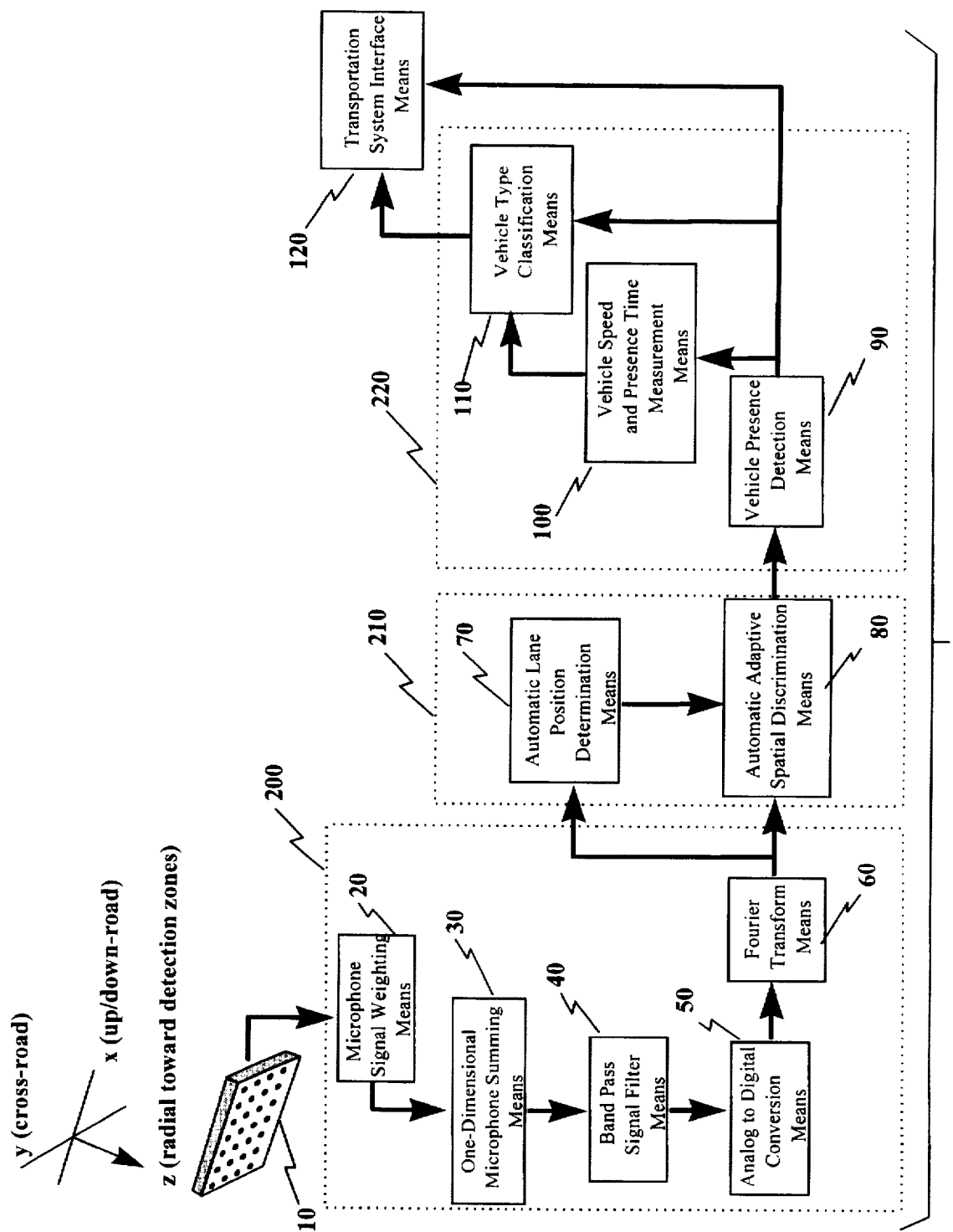
FIG. 2 is a block diagram of the electro-acoustic sensor array and the highway monitoring processing system, the twelve blocks or functional elements providing the requisite internal sensor and processor functions and the interconnections denoting the paths of the input and control signals through the system.
Figure 3:
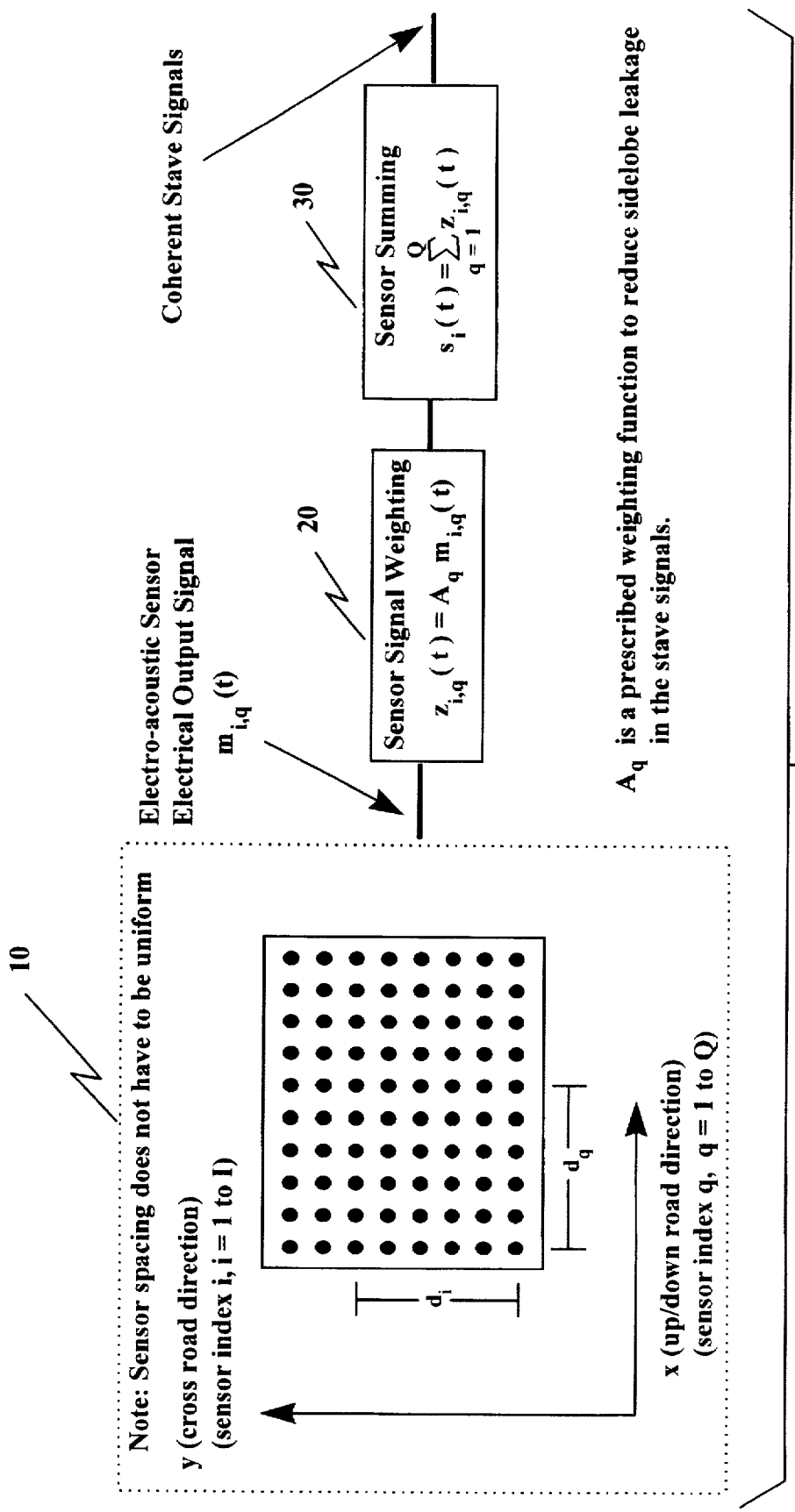
FIG. 3 illustrates the sensor array configuration of block 10, and the processing steps associated with blocks 20 and 30 of the system.

Referring to the diagram in FIG. 1 the reference number 8 designates multiple lanes of a multilane highway for carrying motor vehicles in a single direction. A similar configuration exists for carrying motor vehicles in the opposite direction. At a specified point along side the highway 8 there is mounted an acoustic sensor unit 10. The acoustic sensor unit 10 is comprised of an array of electro-acoustic sensors (microphones) as shown in FIG. 3. The sensor unit 10 is oriented so as to point the sensor array face (sensing side of every electro-acoustic sensor) toward the center of the multiple lanes of the highway 8 as shown in FIG. 2. Motor vehicles 2, 4, 6 in FIG. 1 using the highway 8 create continuous acoustic signals which originate from various parts of the vehicles 2, 4, 6 and radiate in approximately all directions. As shown in FIG. 1, the acoustic signals originating from each vehicle 2, 4, 6 have wavefronts 12 which generally spread spherically as they travel away from their point of origin. These acoustic signal wavefronts 12 travel according to the speed of sound (c ft/sec) in air. They eventually impinge on every electro-acoustic sensor in the sensor array 10 at an angle $\theta_k$ determined by the highway lane carrying the motor vehicle which created the acoustic signal. Hence, each acoustic wavefront 12 from each motor vehicle 2, 4, 6 in each highway lane 8 will impinge on the sensor array 10 at a different time (when a vehicle is present along the highway) and with a different arrival angle $\theta_k$.

In accordance with the present invention, appropriate acoustic signal acquisition means 200 connected to the output of each electro-acoustic sensor in the sensor array 10 and spatial discrimination means 210 connected to the output of means 200 will produce a set of spatially directional signals. Each directional output signal will correspond to each isolated acoustic signal source in each highway lane according to the wavefront angle of arrival $\theta_k$. The spatial signal response pattern is designated 14 in FIG. 1. By connecting vehicle detection processing means 220 to the output of means 210, a vehicle presence indication signal and specific traffic flow parameters can be generated corresponding to each lane of a multi-lane highway 8. By connecting appropriate system interface circuits and processing means 120 to the output of 220, vehicle detection measurements and traffic flow information may be transferred to a transportation system central processor and data base for use in traffic management and traveler information systems.

The acoustic signal acquisition means 200 is shown in more detail in FIG. 2 and is comprised of the means designated as 20, 30, 40, 50, and 60. The acoustic sensor unit 10 is oriented relative to the highway lanes (FIG. 2) so that in a Cartesian coordinate system, the x axis is in the up/down road direction, the y axis is in the cross road direction, and the z axis is perpendicular to the acoustic sensor array face. The z axis points toward the desired detection zone locations in the multi-lane highway. For the purpose of referencing the acoustic sensor array elements (electro acoustic sensors), each line array of elements (FIG. 3) in the x axis direction shall be referred to as rows of the array and each element in a row is identified by its index q. Each row of elements is identified by the row index i (in the y axis direction). Therefore, the electrical analog signal output for each array element or electro-acoustic sensor is identified as $m_{i,q}(t)$ and is the input to the sensor signal weighting means 20 as shown in FIG. 3. Also shown in FIG. 3, element weights $A_q$ are applied along the elements of each row and not across rows. That is, the same weight function is applied to the elements of each row. The resulting weighted analog signals are identified as $Z_{i,q}(t)$ and are input to the sensor summing means 30. The output of means 30 is identified as $s_i(t)$ and represents the set of coherent stave signals (one signal formed from each row of array elements as designated by the index i).

Means 20 and 30 in FIG. 3 realize a conventional summing line array beamformer for each row of elements in the acoustic sensor unit 10. The stave signals $s_i(t)$ output from means 20 and 30 are directional (main axis response of the beam is perpendicular to each row of elements) in the up/down road direction and nearly omni-directional in the cross-road direction. The amount of up/down road directionality or the beam width of the stave signals $s_i(t)$ is determined by the band pass signal filter means 40 shown in FIG. 4. For a prescribed physical sensor aperture size, directivity increases with signal frequency (i.e. the same physical sensor aperture is more directive for high frequency signal components than for low frequency signal components).

The band pass signal filter means 40 is comprised of a frequency discriminating band pass filter, followed by complex demodulation (to shift signals to baseband), followed by a frequency discriminating low pass filter (anti-alias). Note that the band selection filtering and complex demodulation processing facilitate analog to digital sampling (A/D) means 50 at lower sample rates. Lower sampling rates allows the use of less expensive A/D hardware and reduced loading for down stream processing means.

The use of adaptive complex weights in means 80 for the formation of the desired signal response and spatial discrimination of interference assumes that the signal spectrum is narrowband with respect to the signal carrier frequency, the sensor aperture size, and the speed of sound in air (dl<<c/B, where dl is the distance between the sensor element nearest the signal source and the sensor element furthest from the signal source, c is the speed of sound in air, and B is the signal bandwidth). In accordance with the present invention, the aperture size and detection frequency band do not satisfy the narrow band criterion for using only adaptive complex weights to realize the desired adaptive spatial response and interference rejection. The narrowband criterion can be satisfied if the processing band is broken up into smaller frequency cells with adaptive complex weights applied to the resultant signal from each frequency cell before coherently summing across stave signals.

Figure 4:
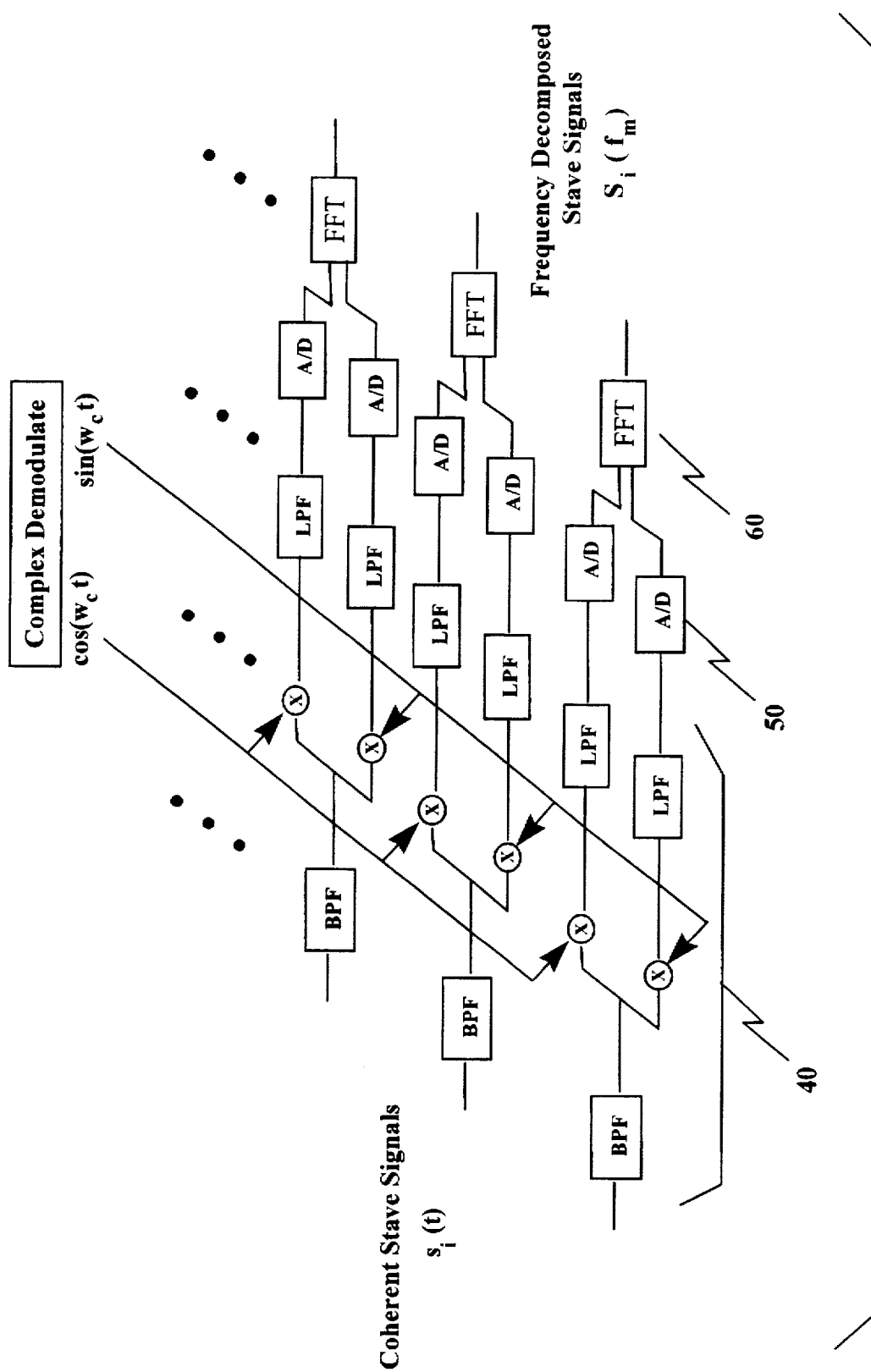
FIG. 4 illustrates the processing steps associated with blocks 40, 50, and 60 of the system.
Figure 5A:
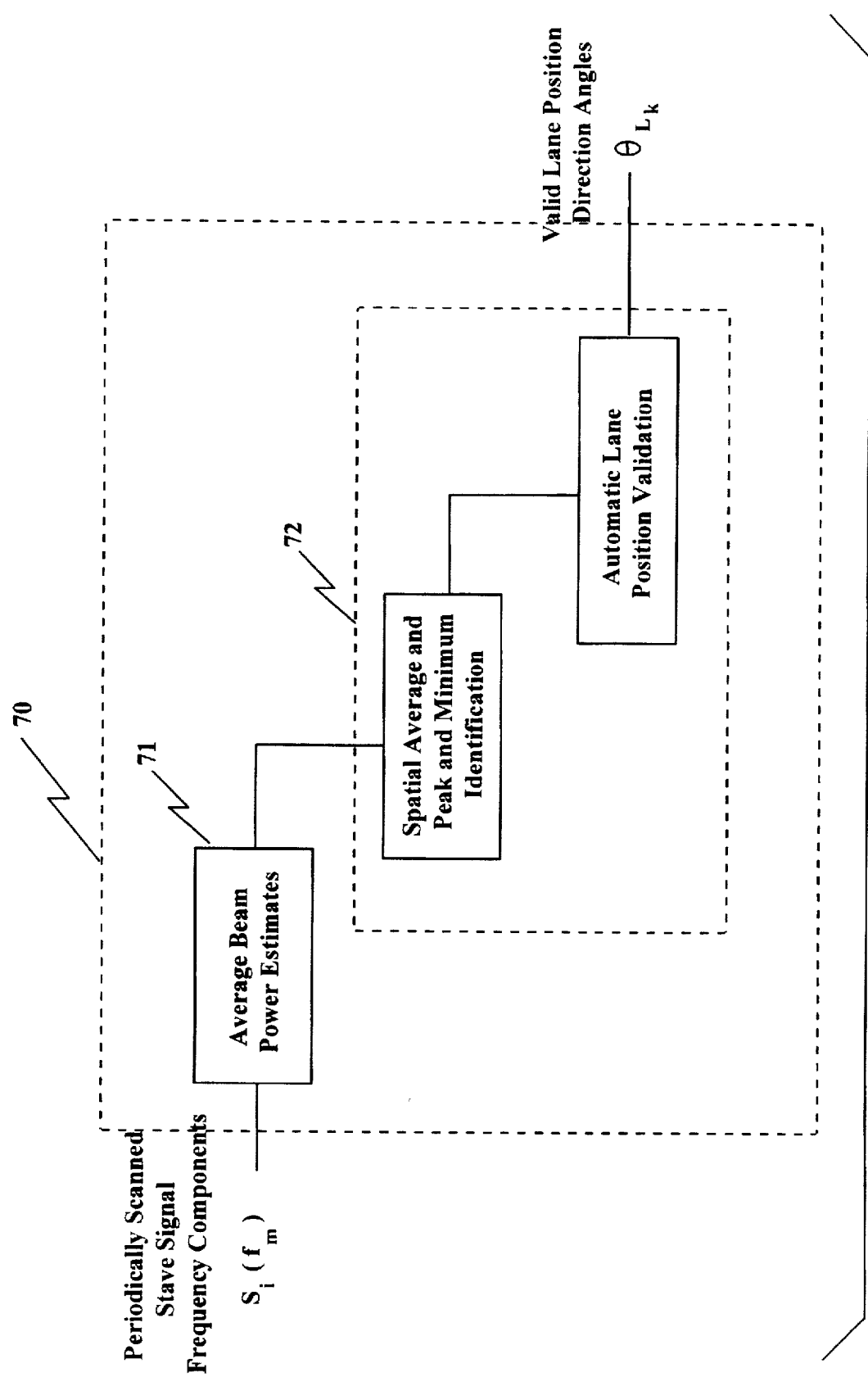
FIG. 5a, 5b, and 5c illustrate the processing step associated with blocks 70, 71, and 72 of the system.
Figure 5B:
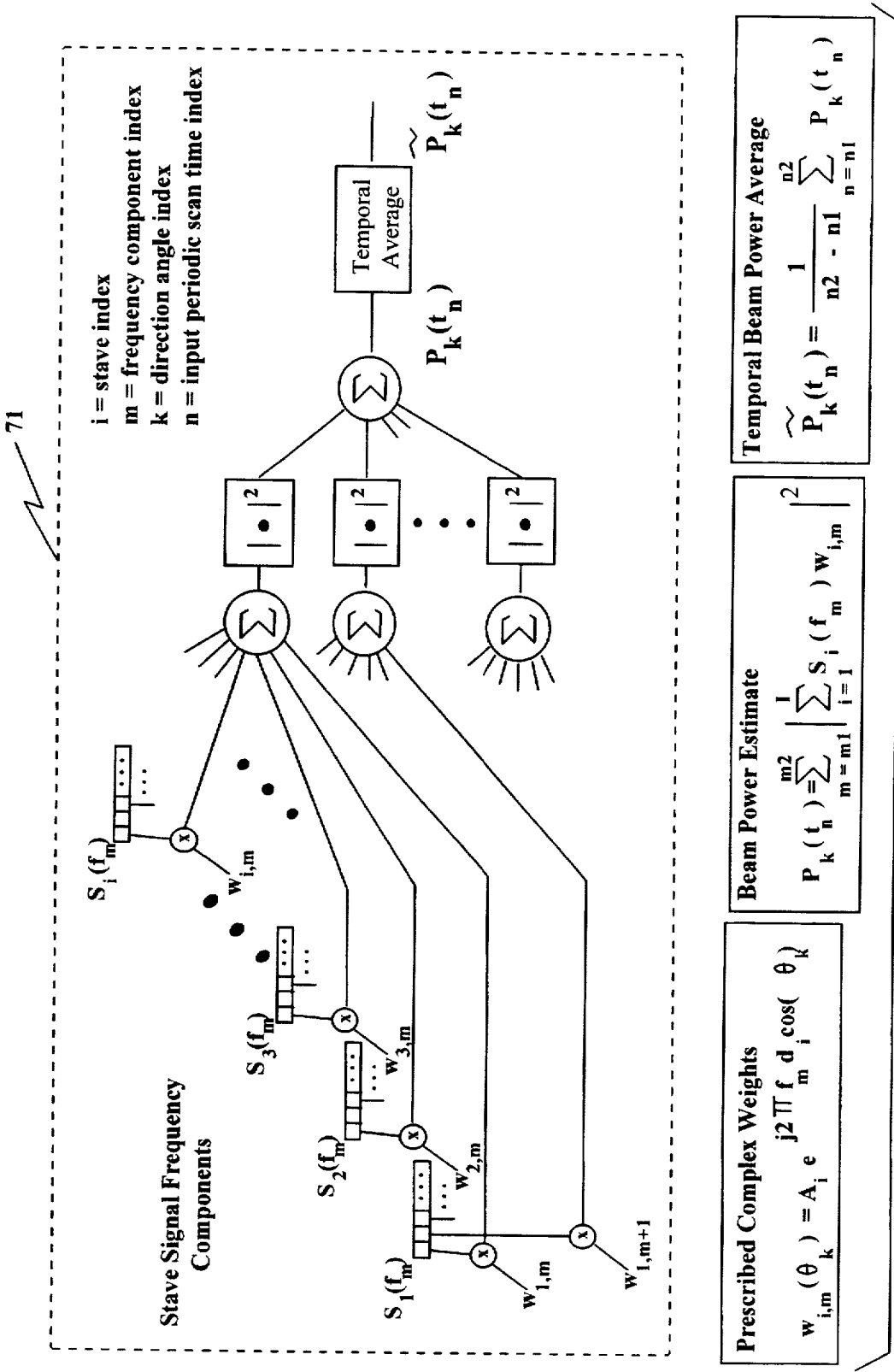
Figure 5C:
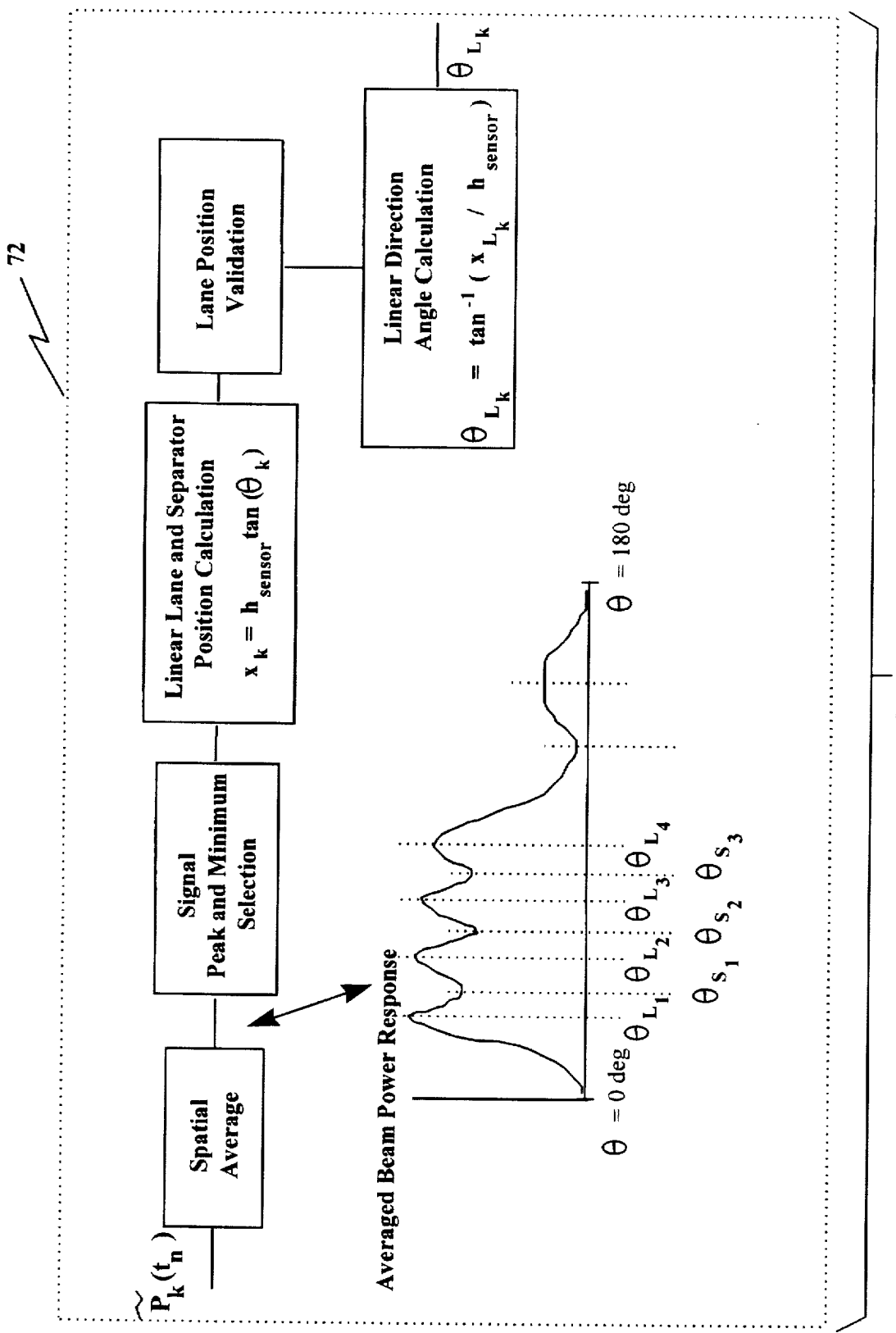
Figure 6A:
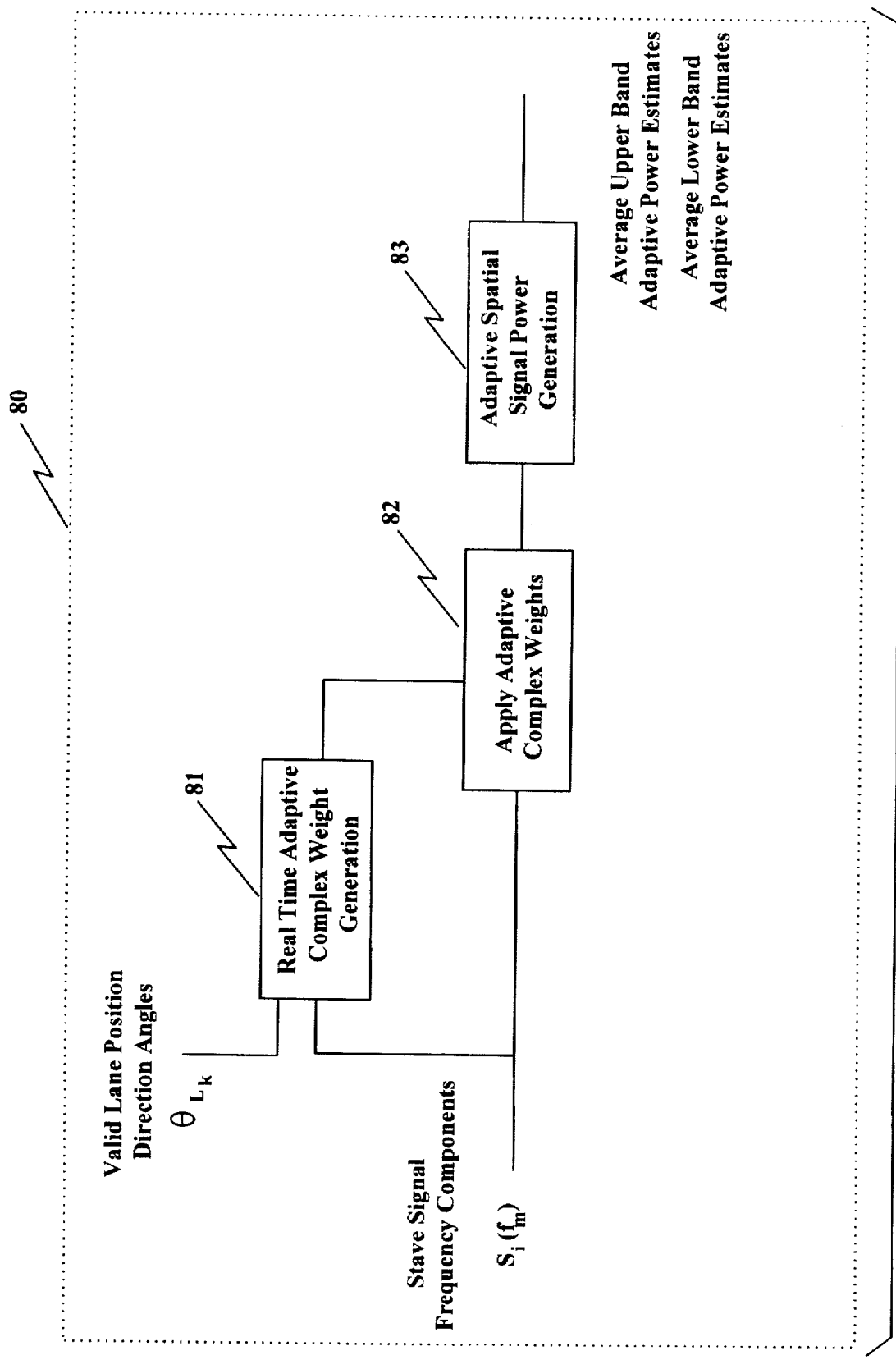
FIG. 6a, 6b, and 6c illustrate the processing steps associated with blocks 80, 81, 82, and 83 of the system.
Figure 6B:
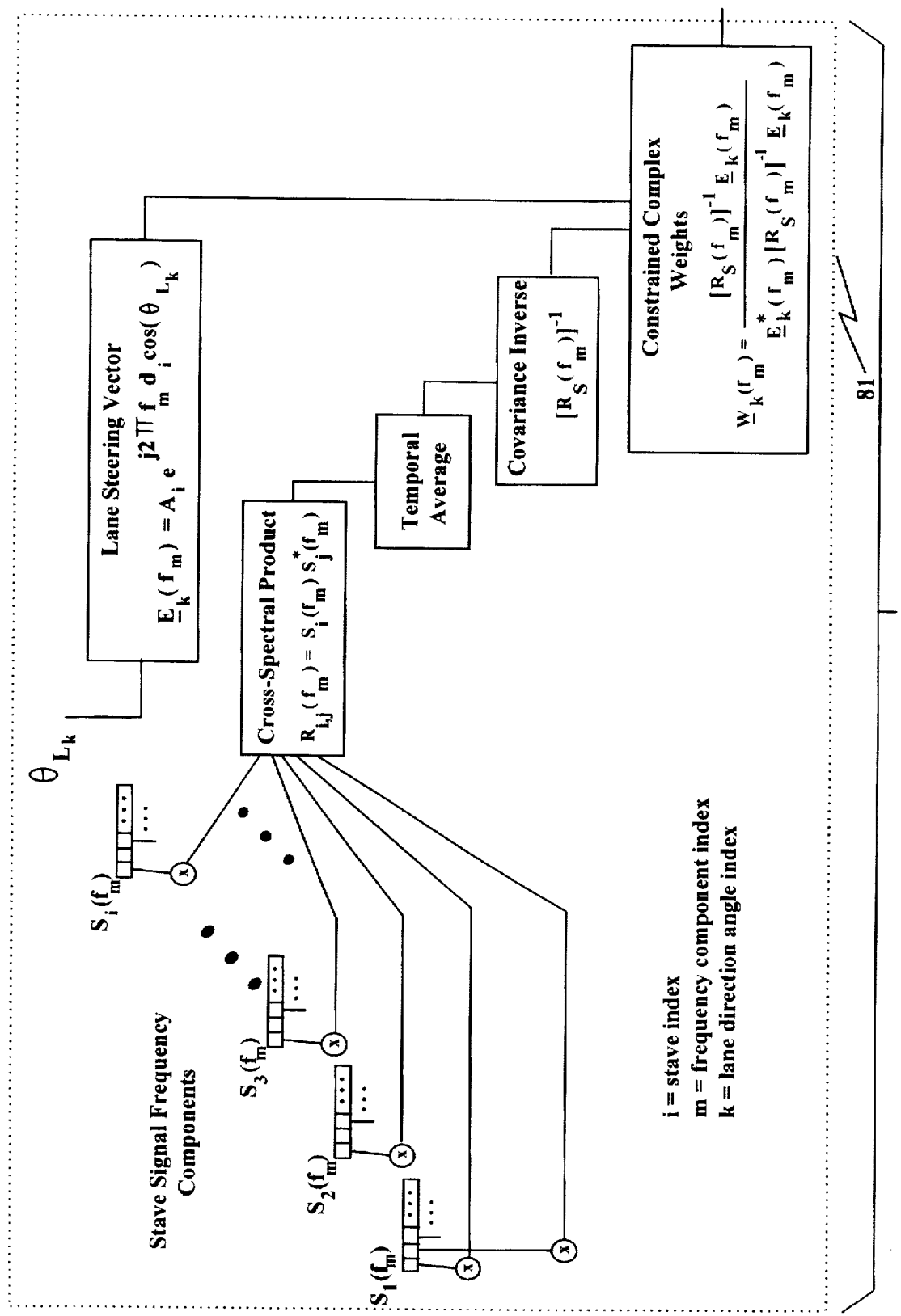
Figure 6C:
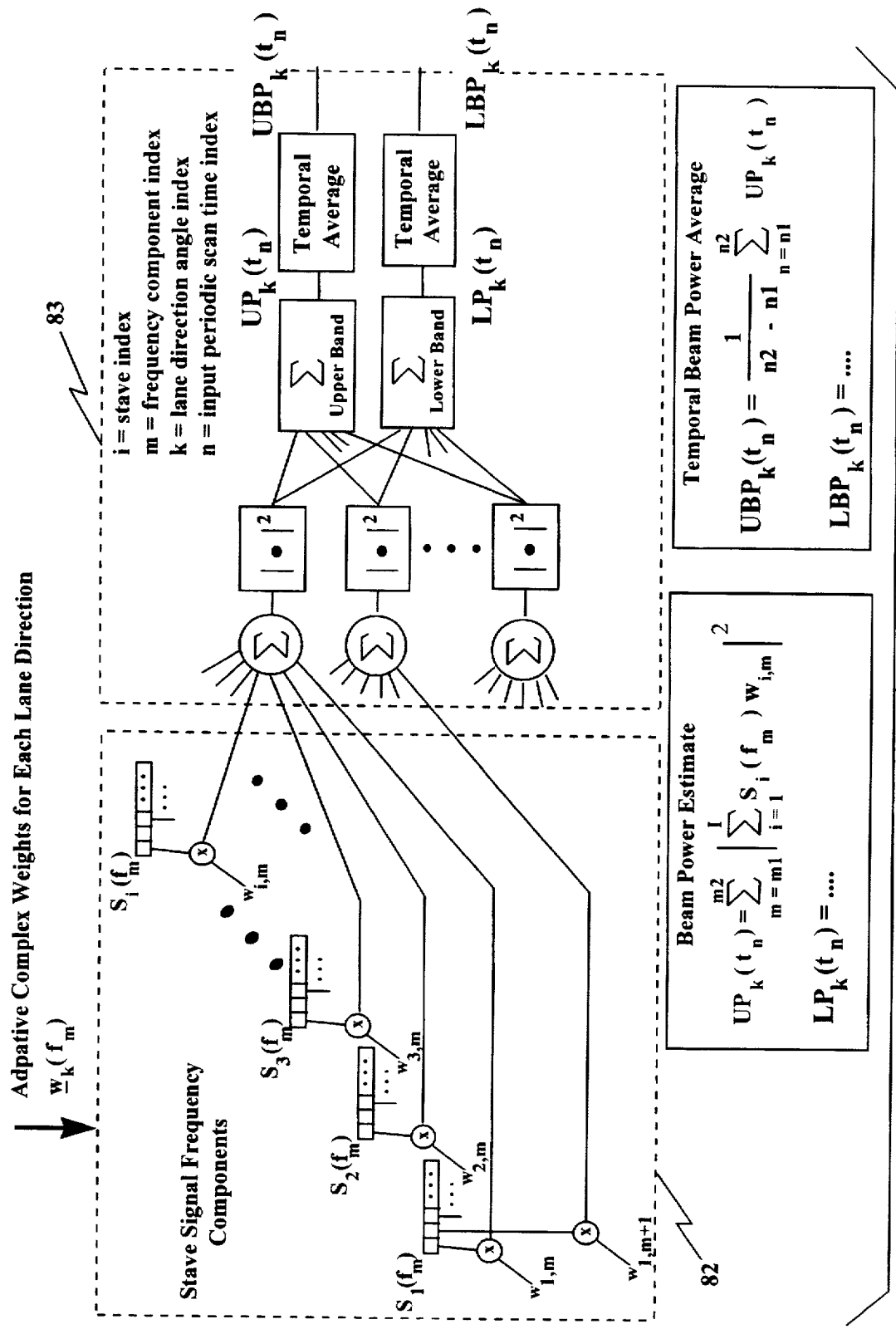

The sampled stave signals output from A/D means 50 shown in FIG. 4 are input to the Fourier Transform means 60 so as to break the processing band of each sampled stave signal into narrowband frequency components $S_i(f_m)$. The Fourier Transform means 60 may be realized using a digital complex to complex Fast Fourier Transform (FFT) algorithm executing in a digital signal processor (DSP). The analog to digital (A/D) sampling means 50 and the Fourier Transform means 60 are performed on a periodic basis to form the stave signal frequency components $S_i(f_m)$ in a periodically scanned format. $S_i(f_m)$ is input to the spatial discrimination means 210 every $\Delta T$ seconds. The spatial discrimination means 210 is shown in FIG. 2 and is comprised of the means designated as 70 and 80. The automatic lane position determination means 70 as shown in FIG. 5a uses the stave signal frequency components $S_i(f_m)$ at installation or during re-calibration to measure the average acoustic signal levels for all arrival angles $\theta_k$ in the cross road direction as shown in FIG. 5b. From these measurements, each lane position and the corresponding direction angle $\theta_{Lk}$ is determined as shown in FIG. 5c for input into means 80. As shown, lane position is found by identifying the peaks (active lanes) and valleys (lane separators and shoulders) of the averaged beam power response. Since vehicles using the highway on average travel within the marked lanes and not on the lane separator lines or shoulders of the highway, it follows that most acoustic signals will originate from within a traveled lane. This will result in higher beam power values for directions $\theta^k$ corresponding to active lanes and lower beam power values for directions $\theta_k$ corresponding to lane separators and shoulders. The automatic adaptive spatial discrimination means 80 is comprised of means 81, 82, and 83 as shown in FIG. 6a. Means 81 uses the output of means 72 and the output of means 60 for the periodic real-time calculation of adaptive complex weights $W_k(f_m)$ as shown in the detail diagram of FIG. 6b. Shown in FIG. 6c, in means 82 the adaptive complex weights $W_k(f_m)$ are periodically applied to specified stave signal frequency components $S_i(f_m)$ to create a directional signal corresponding to each identified highway lane direction $\theta_{Lk}$. Means 83 performs the non-coherent combination of the magnitude squared of specified signal frequency components to form adaptive beam power estimates corresponding to each highway lane direction angle $\theta_{Lk}$. Note in FIG. 6c that adaptive beam power estimates are computed for two frequency bands, the first designated the lower band adaptive power $LBP_k(t_n)$ and the second designated the upper band adaptive power $UBP_k(t_n)$.

Figure 7A:
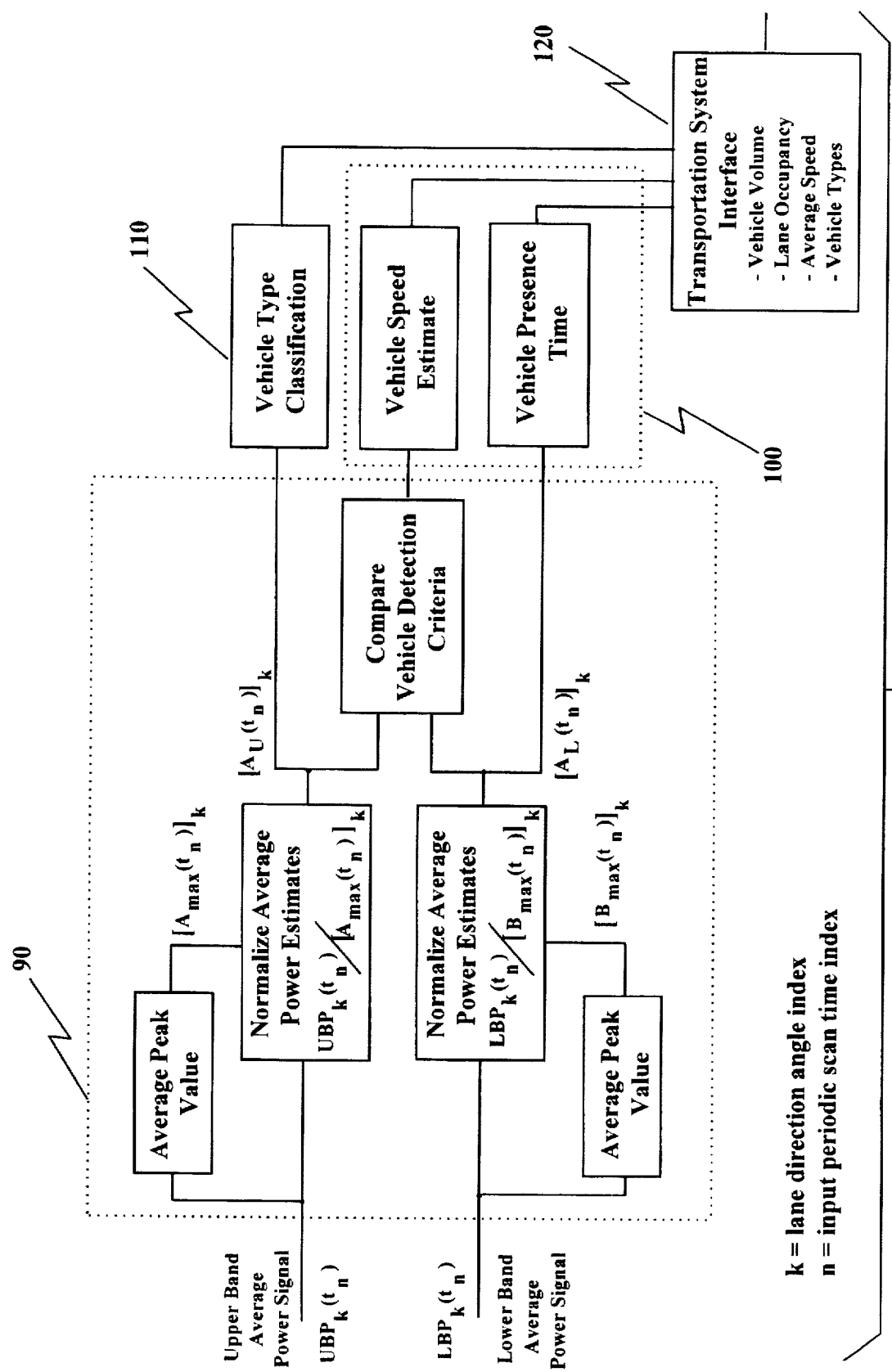
FIG. 7a illustrates the processing steps associated with blocks 90, 100, 110, and 120 of the system.
Figure 7B:
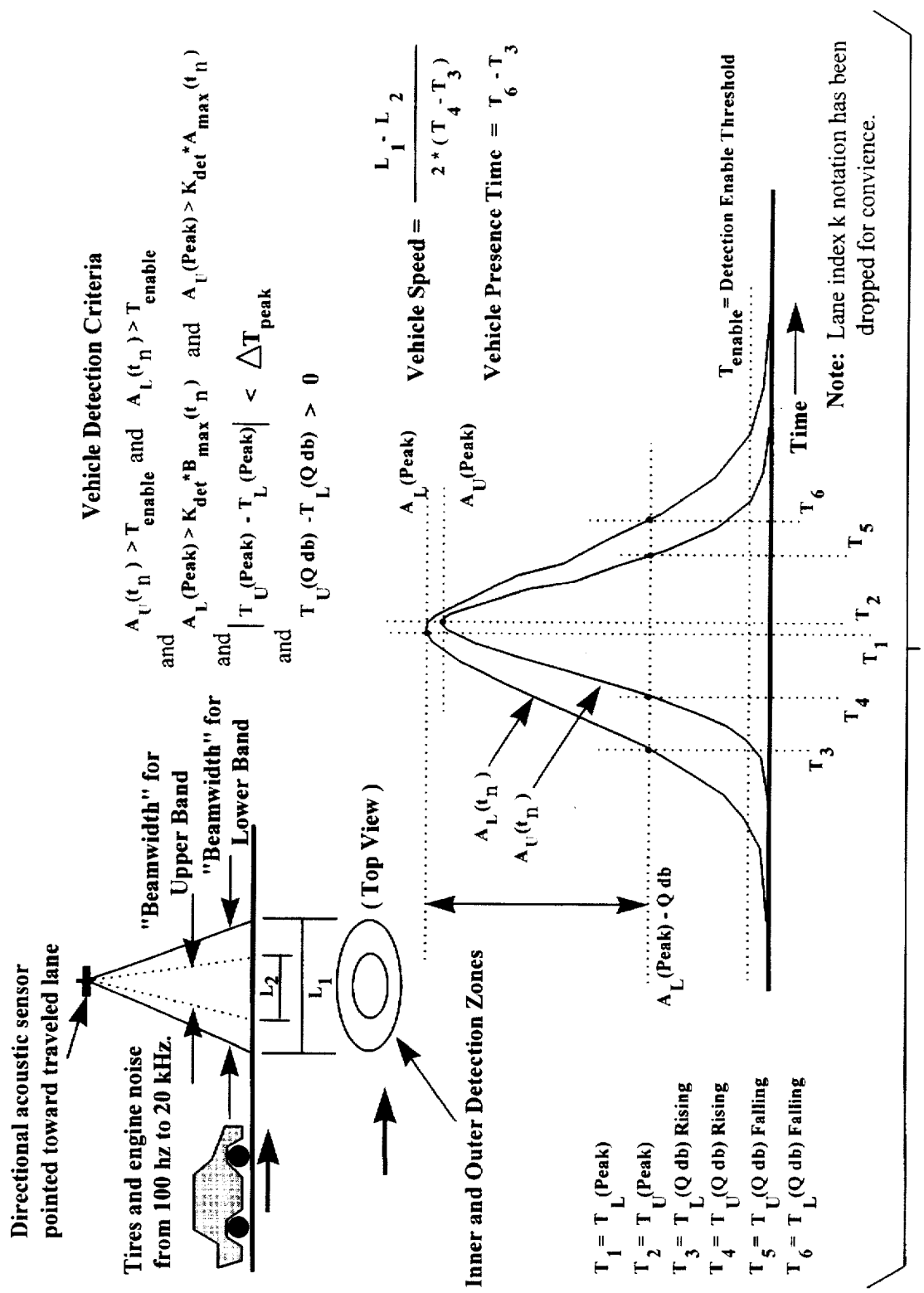
FIG. 7b is a diagram showing the details of the vehicle detection criteria and the speed estimation algorithm and the vehicle presence time algorithm associated with blocks 90 and 100 of the system.

Since sensor directivity increases with signal frequency, the vehicle detection zone corresponding to the upper band adaptive power estimate is smaller than the detection zone corresponding to the lower band adaptive power estimate as shown in FIG. 7b. Additionally, since the spatial response pattern corresponding to each band must be centered at the same location, the detection zone corresponding to the upper band adaptive power estimate is inside the detection zone corresponding to the lower band adaptive power estimate.

In accordance with the present invention, computing adaptive power for two frequency bands and using the adaptive power estimate from each band for vehicle detection means 90, vehicle speed and presence time measurement means 100, and vehicle type classification means 110, two vehicle detection zones are effectively created via advanced signal processing means from only a single physical sensor aperture as shown in FIG. 7a and 7b.

The adaptive power estimates from means 83 are periodically input to means 90 and as shown in FIG. 7a, each adaptive power estimate $UBP_k(t_n)$ and $LBP_k(t_n)$ is periodically normalized by the corresponding average peak value $[A_{max}(t_n)]_k$ or $[B_{max}(t_n)]_k$. The average peak values are determined from each corresponding adaptive power estimate by identifying each peak value and then averaging using a long time constant averaging filter. The average peak value update rate is much slower than the adaptive power estimate update rate but still rapid enough to adjust for changing signal conditions caused by changing traffic flow rate or pavement conditions (wet, snow pack, ice, etc.). In addition to providing a form of automatic gain control (AGC) for slow signal variation caused by changing highway conditions, normalization by each average peak value accounts for known differences in acoustic signal spectral levels between the different frequency bands (spectral pre-whitening). As shown in FIG. 7a, vehicle detection is performed by periodically comparing the normalized adaptive power estimates $[A_U(t_n)]_k$ and $[A_L(t_n)]_k$ for each band to the vehicle detection criteria as shown in FIG. 7b.

Figure 7C:
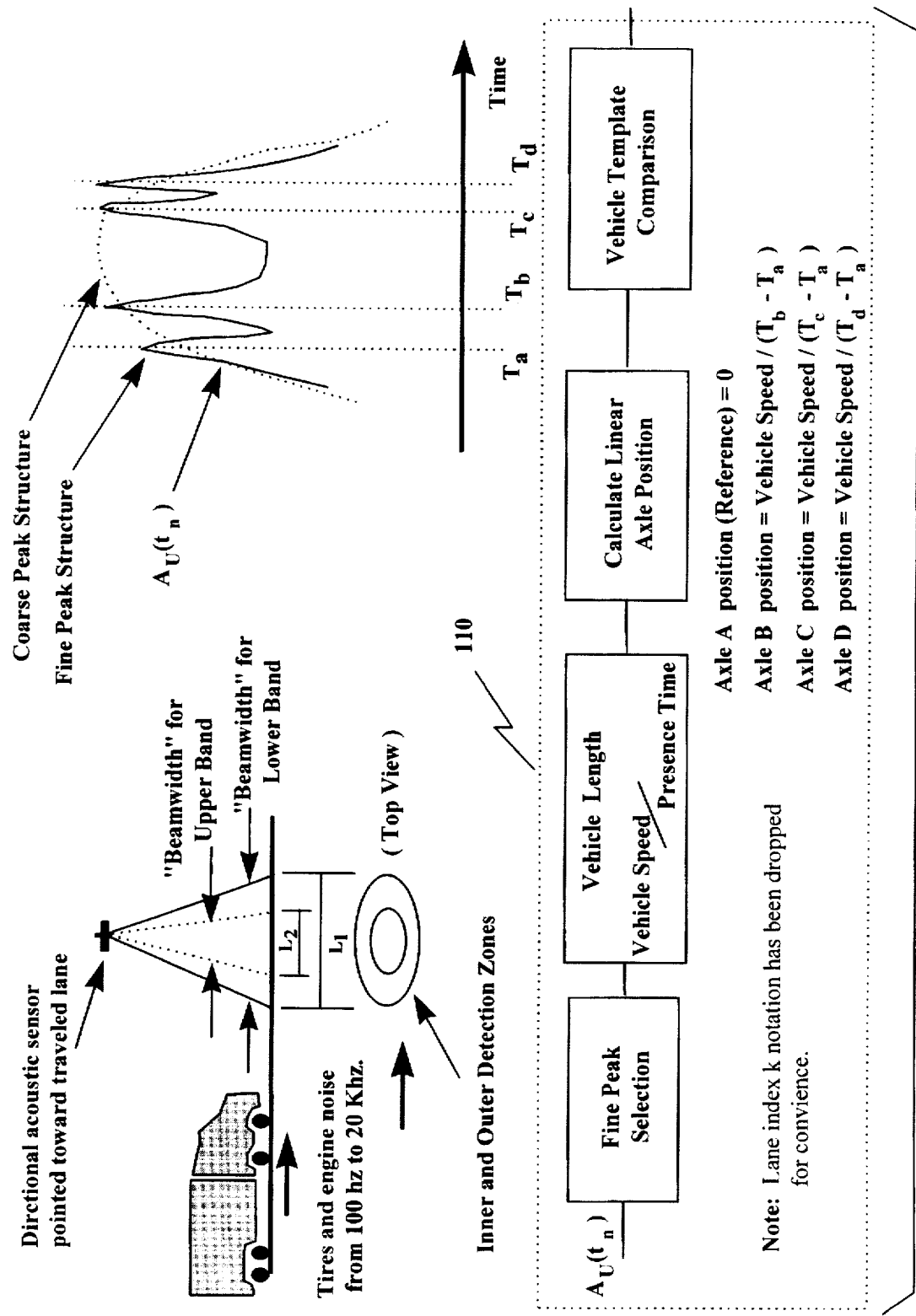
FIG. 7c is a diagram showing the details of the vehicle type classification algorithm associated with block 110 of the system.

The normalized adaptive power estimates $[A_U(t_n)]_k$ and $[A_L(t_n)]_k$ and the vehicle detection results output from means 90 are periodically input to means 100. In accordance with the present invention, individual vehicle speed is estimated (for each qualified vehicle detection) from the time difference of the initial detection using $[A_L(t_n)]_k$ and the initial detection using $[A_U(t_n)]_k$ and a prescribed linear detection zone difference as shown in FIG. 7b. Vehicle presence time is computed (for each qualified vehicle detection) from the total amount of time the lower band adaptive power estimate $[A_L(t_n)]_k$ is detected as shown in FIG. 7b. The normalized adaptive power estimate $[A_U(t_n)]_k$ and the vehicle detection results output from means 90 and the vehicle speed and presence time output from means 100 are input to means 110. In accordance with the present invention, the fine peak structure in the normalized upper band adaptive power estimate $[A_U(t_n)]_k$ and the vehicle speed estimate is used to calculate relative linear vehicle axle position as shown in FIG. 7c. Vehicle length is calculated from the estimated vehicle speed and presence time as shown in FIG. 7c. Vehicle type classification is determined by comparison of the estimated vehicle length and the estimated linear axle position with standard vehicle type templates as shown in FIG. 7c.

In accordance with the present invention, outputs from means 100 and 110 are input to means 120. Means 120 provides for the determination of traffic flow parameters and the generation of a system interface for transfer of appropriate traffic information to a central processor for traffic management and traveler information. Vehicle volume per lane per unit time is determined by counting the number of vehicle detections in each lane for a prescribed period off time. Lane occupancy in percentage is determined by dividing the total vehicle presence time for each lane by the observation time and multiplying by 100. Average speed is determined by averaging all vehicle speed estimates for each lane over the number of vehicles detected. Vehicle type statistics are created for each observation interval by forming a vehicle type histogram in which the number of each type of vehicle detected is placed into the appropriate vehicle type bin.

The present invention is suitable for practice in a variety of differing forms. Although the present invention has been described in terms of a specific embodiment thereof, it is possible to modify and alter details thereof by those skilled in the art without departing from the spirit and scope of the present invention.

What we claim is:

1. A motor vehicle detection system for providing automatic multiple lane position determination, multiple lane traffic monitoring, significant reduction of false detections due to out of lane sound sources, individual vehicle speed measurement, and individual vehicle type classification, said system comprising:

11

A. a plurality of electro-acoustic sensors arranged in an array according to a prescribed spacing for converting impinging acoustic signals from motor vehicles into individual electrical signals at the electro-acoustic sensor outputs;

B. means to coherently scale and combine said individual electrical signals at said electro-acoustic sensor output for creating a plurality of coherent stave signals;

C. means to perform signal frequency band discrimination, digital sampling, and Fourier transformation of said coherent stave signals for creating a plurality of frequency decomposed stave signals;

D. means responsive to said frequency decomposed stave signals to automatically and adaptively perform spatial discrimination for creating a plurality of directional signals, each representing a single acoustic signal or a collection of acoustic signals originating within each said active traveled lane;

E. means responsive to said coherent directional signals for creating a plurality of vehicle presence signals and for directly measuring individual vehicle speed and for determining individual vehicle type classification;

F. means responsive to said vehicle presence signals and responsive to said individual vehicle speed measurements and responsive to said individual vehicle type classification for creating a transportation system signal and information message interface.

2. A motor vehicle detection system as set forth in claim 1, wherein said means for creating said directional signals comprises:

A. an input port for connection to the source of said frequency decomposed stave signals in a periodically scanned format;

B. means responsive to said periodically scanned frequency decomposed stave signals for creating a beam power response function for all cross road direction angles and for creating a plurality of valid lane direction angles and valid lane separation direction angles;

C. means responsive to said periodically scanned frequency decomposed stave signals and responsive to said valid lane direction angles to perform in real time, adaptive spatial discrimination for creating a plurality of directional signal frequency components.

3. A motor vehicle detection system as set forth in claim 2, wherein said means for creating said beam power response function comprises:

A. means responsive to said frequency decomposed stave signals to apply a plurality of prescribed complex weights to said frequency decomposed stave signals and to coherently combine the resulting weighted stave signals for creating a plurality of directional beam signal frequency components;

B. means to perform a non-coherent sum of the squared magnitudes of said beam signal frequency components for a prescribed set of said frequency component index values for creating a plurality of directional beam power estimates;

C. means responsive to said beam power estimates to compute a temporal and spatial average of said beam power estimates for creating a beam response function;

D. means responsive to said beam response function to identify a plurality of peak and minimum values of said beam response function and to extract said direction angles corresponding to said peak values and said minimum values for creating a plurality of potential lane direction angles and for creating a plurality of potential lane separator direction angles;

E. means responsive to said potential lane direction angles and said lane separator direction angles to compute and validate linear lane positions and linear lane separator positions for creating a plurality of valid lane direction angles.

4. A motor vehicle detection system as set forth in claim 2, wherein said means for creating said directional signal frequency components comprises:

A. means responsive to said frequency decomposed stave signals and responsive to said valid lane direction angles for computing in real time a plurality of adaptive complex weights;

B. means to apply in real time said adaptive complex weights to said frequency decomposed stave signals for creating a plurality of adaptive complex weighted stave signal frequency components;

C. means to perform in real time a plurality of prescribed coherent sums of said adaptive complex weighted stave signal frequency components for creating a plurality of adaptive directional signal frequency components.

5. A motor vehicle detection system as set forth in claim 1, wherein said means for creating said vehicle presence signals and for measuring said individual vehicle speed and for determining said individual vehicle type classification comprises:

A. an input port for connection to the means for creating said directional signal frequency components;

B. means responsive to said directional signal frequency components for creating a plurality of vehicle presence signals indicating vehicle detections;

C. means responsive to said directional signal frequency components and responsive to said vehicle presence signals for creating an individual vehicle speed measurement corresponding to each said vehicle detection;

D. means responsive to said directional signal frequency components and responsive to said vehicle presence signals and responsive to said individual vehicle speed measurement for creating an individual vehicle type classification.

6. A motor vehicle detection system as set forth in claim 5, wherein said means for creating said vehicle presence signals comprises:

A. means to periodically compute the square of the magnitude of said adaptive directional signal frequency components for creating a plurality of adaptive directional signal spectral components;

B. means to periodically perform prescribed sums of said adaptive directional signal spectral components for creating a plurality of upper frequency band adaptive power estimates and for creating a plurality of lower frequency band adaptive power estimates;

C. means to periodically compute temporal averages of said upper frequency band adaptive power estimates and of said lower frequency band adaptive power estimates for creating an upper band average power signal and a lower band average power signal;

D. means to periodically compare said upper and lower band average power signals to prescribed threshold criteria for determining the presence or absence of said motor vehicle emitting said acoustic signals for creating a binary vehicle presence signal;

E. means to periodically integrate said upper frequency band adaptive power estimates for increasing detection sensitivity for slow moving or stationary motor vehicles;

F. means to periodically integrate said lower frequency band adaptive power estimates for increasing detection sensitivity for slow moving or stationary motor vehicles;

G. means to periodically compare said integrated upper and lower band average power signals to prescribed threshold criteria for determining the presence or absence of said motor vehicle emitting said acoustic signals for creating a binary vehicle presence signal.

7. A motor vehicle detection system as set forth in claim 6, wherein said means for creating said individual vehicle speed measurements comprises:

A. means to measure the time of initial threshold crossing of said lower band average power signal and said upper band average power signal;

B. means to compute the time difference of said initial threshold crossings of said upper band and lower band average power signals;

C. means to compute said individual vehicle speed by dividing a prescribed detection zone size difference by said threshold crossings time difference.

8. A motor vehicle detection system as set forth in claim 7, wherein said means to compute said time difference of said initial threshold crossings of said average power signals comprises:

A. means responsive to said threshold crossings to validate said time difference measurement by determining if said lower band average power signal crossed said threshold before said upper band average power signal threshold crossing;

B. means responsive to said threshold crossings to validate said time difference measurement by determining if said upper band average power signal crossed said threshold after said lower band average power signal threshold crossing;

C. means responsive to said threshold crossings to validate said time difference measurement by determining if said upper band average power signal crossed threshold within a valid time interval after said lower band average power signal threshold crossing;

D. means to increase precision of said time difference measurement by interpolating said lower band average power signal threshold crossing time and by interpolating said upper band average power signal threshold crossing time before computing said time difference.

9. A motor vehicle detection system as set forth in claim 5, wherein said means for creating said individual vehicle type classification comprises:

A. means to determine individual vehicle length by subtracting said detection zone size from ratio of said individual vehicle speed and vehicle time in said detection zone;

B. means to determine individual vehicle axle spacing by measuring a plurality of time differences between peak values of said upper band average power signal during interval of vehicle presence indicated by said vehicle presence signal;

C. means to determine said individual vehicle type classification by comparing said vehicle length and said vehicle axle spacing and said peak values of said upper and lower band average power signals with prescribed vehicle templates.

10. An automatic highway lane position determining system for measuring the acoustic energy levels in all cross-road directions and from said acoustic energy levels automatically identifying each and every active traveled lane, said system comprising:

A. an input port for connection to a source of frequency decomposed signals from a plurality of electro-acoustic sensors in a periodically scanned format;

B. means responsive to said frequency decomposed signals for creating a beam power response function for all cross road direction angles and for creating a plurality of valid lane direction angles and valid lane separation angles;

C. an output port for application of said lane direction angles and said lane separation direction angles to a processor, indicator, or visual display.

11. An automatic highway lane position determining system as set forth in claim 10, wherein said means for creating said beam power response function and said valid lane direction and separation angles comprises:

A. means responsive to said frequency decomposed signals to apply a plurality of prescribed complex weights to said frequency decomposed signals and to coherently combine the resulting weighted signals for creating a plurality of directional beam signal frequency components;

B. means to perform a non-coherent sum of the squared magnitudes of said directional beam signal frequency components for a prescribed set of the frequency component index values for creating a plurality of directional beam power estimates;

C. means responsive to said beam power estimates to compute a temporal and spatial average of said beam power estimates for creating said beam power response function;

D. means responsive to said beam power response function to identify a plurality of peak and minimum values of said beam power response function and to extract said direction angles corresponding to said peak values and said minimum values for creating a plurality of potential lane direction angles and for creating a plurality of potential lane separator direction angles;

E. means responsive to said potential lane direction angles and said potential lane separator direction angles to compute and validate linear lane positions and linear lane separator positions for creating said valid lane direction angles.

12. An automatic highway lane position determining system as set forth in claim 11, wherein said means for creating said valid lane direction angles comprises:

A. means responsive to said potential lane direction angles and said potential lane separator direction angles to compute from a sensor site geometry, linear lane positions and linear lane separator positions;

B. means responsive to said linear lane positions and said linear lane separator positions to compare to site highway construction drawings and to standard highway construction specifications for creating a plurality of valid linear lane positions and valid linear lane separator positions;

C. means responsive to said valid linear lane positions for computing from said sensor site geometry said valid lane direction angles.

13. A system for measuring individual vehicle speed using a single directional passive acoustic sensor mounted above the highway and pointed toward the lanes carrying said vehicles, said system comprises:

A. a plurality of electro-acoustic sensors arranged in an array according to a prescribed spacing for converting impinging acoustic signals from said motor vehicles into individual electrical signals at said electro-acoustic sensor outputs;

B. means to scale and combine said electrical signals at said electro-acoustic sensor output for creating a plurality of directional signals each representing a single acoustic signal or a collection of acoustic signals originating within each active traveled lane;

C. an above the road mounting structure for mounting said electro-acoustic sensor array near lanes carrying said vehicles whose speed is to be measured;

D. means responsive to said directional signals to perform frequency band discrimination and signal envelop detection for creating a lower band power signal and for creating an upper band power signal;

E. means to perform threshold comparisons for measuring the time difference between initial threshold crossings corresponding to said lower band power signal and said upper band power signal;

F. means to compute said individual vehicle speed by dividing a prescribed detection zone size difference by said threshold crossings time difference.

14. A system for measuring individual vehicle speed as set forth in claim 13, wherein said means for measuring said threshold crossings time difference comprises:

A. means responsive to said threshold crossings to validate said time difference measurement by determining if said lower band power signal crossed said threshold before said upper band power signal threshold crossing;

B. means responsive to said threshold crossings to validate said time difference measurement by determining if said upper band power signal crossed said threshold after said lower band power signal threshold crossing;

C. means responsive to said threshold crossings to validate said time difference measurement by determining if said upper band power signal crossed threshold within a valid time interval after said lower band power signal threshold crossing;

D. means to increase precision of said time difference measurement by interpolating said lower band power signal threshold crossing time and by interpolating said upper band power signal threshold crossing time before computing said time difference.

* * * * *